No. 844,090. PATENTED FEB. 12, 1907.
J. BIJUR.
AUTOMATIC END CELL SWITCH.
APPLICATION FILED SEPT. 13, 1905.
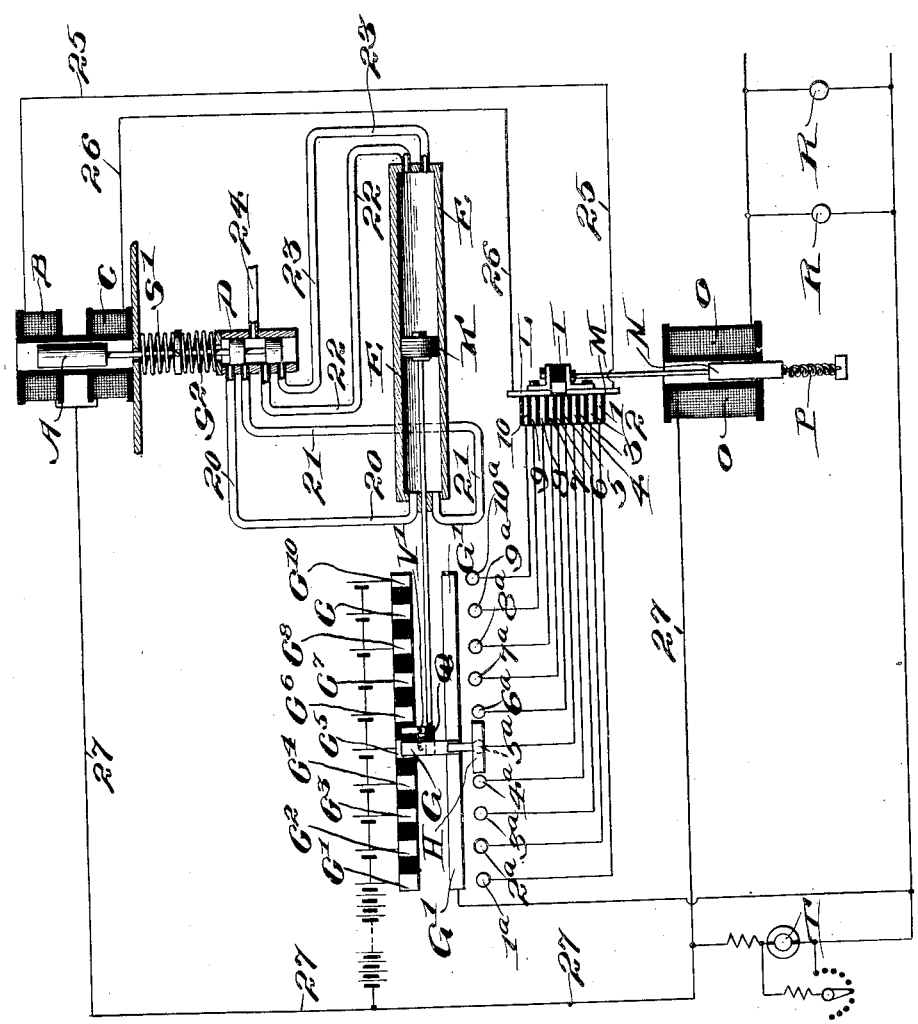
Witnesses
Inventor
JOSEPH BIJUR
By his Attorneys
Dickerson, Brown, Raegener & Binney

UNITED STATES PATENT OFFICE.

JOSEPH BIJUR, OF NEW YORK, N. Y., ASSIGNOR TO THE GENERAL STORAGE BATTERY COMPANY, A CORPORATION OF NEW YORK.

AUTOMATIC END-CELL SWITCH.

No. 844,090.                Specification of Letters Patent.            Patented Feb. 12, 1907.

Application filed September 13, 1905. Serial No. 278,337.

*To all whom it may concern:*

Be it known that I, JOSEPH BIJUR, a citizen of the United States, and resident of the borough of Manhattan, city, county, and State of New York, have invented certain new and useful Improvements in Automatic End-Cell Switches, of which the following is a specification accompanied by drawings.

This invention relates to end-cell switches, particularly adapted to those systems of distribution in which a storage battery is used for the purpose of reinforcing the generator and assisting it to supply current to the load when the current demands exceed a certain predetermined limit and also to maintain the load on the generator substantially constant, although the invention may be used in any connection in which it is applicable. When the current demanded by the load is less than the normal generator supply, the excess current flows into the battery charging it. When the load is in excess of the generator-load, this stored energy in the cells is given out to supply that excess above the normal generator-load. The normal generator-load is the average of the external load, so that the amount of battery input is approximately equal to the battery output—that is, the time integral of the excess of current output to external load above the average load taken over any considerable unit of time is approximately equal to the time integral of the current input to the battery.

In order that the battery may be caused to discharge and to receive charge, the electromotive force across the battery-terminals is varied, and this required variation is practically proportional to the amount of current flowing into or out of the battery. In order to effect this change of electromotive force at the battery-terminals, it has been customary to employ dynamo-electric machines in series with the battery-circuit, which machines are so wound or controlled that their electromotive force changes in magnitude and direction to cause charge and discharge of the battery and by an amount which is required to maintain the generator-load constant.

The object of this invention is to secure the charge and discharge of the battery automatically without the use of an auxiliary dynamo-electric machine.

Further objects of the invention will hereinafter appear; and to these ends the invention consists of an end-cell switch for carrying out the above objects embodying the features of construction, combinations of elements, and arrangements of parts having the general mode of operation substantially as hereinafter fully described and claimed in this specification and shown in the accompanying drawings, in which the figure is a diagrammatic view of the switch, partly in section, with suitable circuits and connections therefor.

In the drawing a rapid-acting or high-speed cell-switch is shown, which varies its position, and thereby varies the number of cells in series responsive to load changes. Obviously the variation of the number of cells in series will change the electromotive force of the battery as a whole.

$C'$ $C^2$ $C^3$, &c., are contacts between which one or more end cells of a battery are connected. G is a brush which travels along these contacts successively, joining them to the bus-bar $G'$.

$V'$ is an advance brush, traveling with the main brush G, insulated therefrom and electrically joined to it by resistance Q. The object of this brush is to prevent either the opening of the circuit or the short-circuiting of the cells between adjacent contacts.

The movement of brush G is effected by means of the piston K working in cylinder E. The valve D receives a fluid under suitable pressure through pipe 24. Two pipes 22 and 23 connect at one end of cylinder E, and at the other end two pipes 20 and 21 connect, all leading to the valve D. In the position of the valve as shown the valve-ports are half open. The working fluid enters by pipe 24, passes out through pipe 21 into the cylinder E, and out through pipe 20, whence it falls into any suitable receiving-tank. Some of the fluid passes through pipe 22 into cylinder E and returning by pipe 23 drops into any suitable receiving-tank. (Not shown.) Thus on both sides of the piston K the fluid is in continuous circulation.

If the working fluid be oil and if the valve be moved upward, pipes 20 and 22 will be closed, 21 and 23 will be open, with the result that no oil can leave the left-hand side of the cylinder, and the port admitting oil through pipe 21 is fully open. Also no liquid is admitted by 22 to the right-hand side of the cylinder; but the pipe 23, leading to the drip-tank, is fully open. The piston K therefore must move to the right, carrying with it the brush G, which is connected to the piston by rod F, the oil in the right-hand side exhausting through pipe 23. Conversely, if the valve moves downward it is obvious that a reverse movement of the piston will take place. The object of causing the liquid to circulate continuously is that rapid motion and quick acceleration may be imparted to the piston and attached brush.

It is essential that the brush G should move exactly over a contact and not come to rest at some position between two adjacent contacts, and the other devices and connections shown are to cause this exact range of movement to take place.

O is a solenoid, in this instance in series with the main circuit, attracting core N upward, which attraction upward is opposed by spring P. This core is connected to sliding contacts L and M, which are insulated from each other and from the core by means of the insulation I. These contacts move along a commutator, preferably straight, (indicated by the numerals 1 2 3 4, &c.) Corresponding to each commutator-bar there is an auxiliary contact on the end-cell switch, which contacts are numbered $1^a$ $2^a$ $3^a$ $4^a$, &c., to correspond to the commutator-bars to which they are joined. The valve D is controlled by the movement of the solenoid-core A, which is surrounded by two coils B and C. If B is energized, it is obvious that the core A will move upward, while if C is energized A will move downward. The two equalizing-springs $S'$ and $S^2$ will always return the core and the attached valve to its normal central position.

Following the circuits, starting with line 27, which passes to a terminal of each one of the coils B and C, it is obvious that if line 25 is part of a continuous circuit B will be energized, while if line 26 is part of a continuous circuit C will be energized. Line 26 is joined to contact L and line 25 to contact M, as shown. Since wire 27 is attached to the positive side of the battery, if wires 25 or 26 be connected to the negative side of the battery the corresponding coil of the valve moving solenoids B and C will be energized. Therefore if contacts L or M touch a commutator-segment, which is joined to the auxiliary contact on which the traveling end H of contact G rests, it is clear that B or C will be energized as the circuit is completed.

In the drawing the piece H touches auxiliary contact $5^a$. Contact M also touches auxiliary contact 5. Consequently the circuit is completed at the positive end of the battery through wire 27, winding B, to contact M by connection 25, to commutator-bar 5, thence to auxiliary contact $5^a$, and to the negative bus-bar $G'$. The winding B now being energized will cause the core A to move upward, and the piston K will begin to travel toward the right. This travel will be continued until contact-piece H passes off of the contact $5^a$, and the new position will therefore be immediately on main contact $C^6$. In other words, the main end-cell-switch brush must always travel until the piece H rests on an auxiliary contact that is joined to a commutator-bar, which bar is not touched by either contacts L or M.

It is obvious that if the outside load R R requires an increased current the magnetization of winding O will be increased and the core N will move upward, carrying with it contacts L and M, while if the load decreases the spring P will overcome the pull of the winding O, and the core N, together with contacts L and M, will descend. For any given external load there will be a definite position of the solenoid-core, and therefore of the contacts L and M, while for any given battery charge or discharge there is a definite number of end cells to be included in the circuit. For each position of contacts L and M there is manifestly a corresponding position of the main brush G. Therefore with load changes the required changes in the number of cells in series will be effected. An increase in external load will produce an increase in the number of cells in series, and therefore an increase in battery discharge, and by proper adjustment this increase in the battery discharge may be equal to the increase in load, so that the amount of current supplied by the generator is not augmented, although that delivered to the outside load is augmented.

Since on rapidly-fluctuating loads the changes in current requirements take place in very short intervals of time, it is essential that the movement of the switch be very rapid in order to compensate for these changes in current condition, and for this reason it has been considered advisable to adopt a hydraulic system in which the actuating fluid constantly circulates, as before described. In ordinary end-cell switches, whether automatic or semi-automatic, the movement of the brush is too slow to compensate for rapid load changes. The speed of motion of end-cell switches as made at present varies from six to ten feet per minute—that is to say, in a large end cell switch of one thousand amperes capacity or over the time required for the brush to move from one contact to the next adjacent one is from four to eight seconds. Obviously such rates of speed would be useless for the purposes which this invention is designed to effect. In the automatic hydraulic switch here described it is intended that the motion shall take place with more than five times this velocity—say from thirty to fifty feet per minute. Preferably the rapidity of motion of this switch when the total travel is long will be one hundred feet per minute or above, and it is intended that it shall move eight to ten contacts within one second.

Obviously this invention may be embodied in widely-varying forms, and some features of the invention may be used without others.

Therefore, without limiting the invention to the constructions shown and described nor enumerating equivalents, I claim, and desire to obtain by Letters Patent, the following:

1. The combination with a supply-circuit and end cells of a storage battery, of an end-cell switch, a pressure-cylinder and piston connected to operate the switch, means for continuously circulating the working fluid on each side of the piston, an electroresponsive device for controlling said piston and cylinder, and means including circuits and connections devised and arranged for controlling said electroresponsive device and thereby automatically changing the position of the switch to include more or less cells in series, according to changes in the current conditions of the supply-circuit.

2. The combination with a supply-circuit and the end cells of a storage battery, of an end-cell switch, a pressure-cylinder and piston connected to operate the switch, means for continuously circulating the working fluid on each side of the piston, a controlling-valve for controlling the circulation of the fluid on both sides of the piston and thereby actuating the piston, means for controlling said valve in accordance with changes in the current conditions of the working circuit, including circuits and connections devised and arranged for automatically changing the position of the switch to include more or less cells in series, according to changes in the current conditions of the supply-circuit.

3. The combination with a supply-circuit, and the end cells of a storage battery, of an end-cell switch having a main switch-brush and main contacts, a fluid-pressure device for actuating said switch, a bus-bar and set of auxiliary contacts corresponding to the main contacts, a set of commutator-bars corresponding to said sets of contacts, electric connections between the auxiliary contacts and the commutator-bars, a pair of sliding contact-pieces movable together over said bars and insulated from each other, a contact-piece electrically connected to the main switch-brush and movable over the auxiliary contacts, a valve for the fluid-pressure device controlled by magnets jointly connected at one side to the storage battery, and separately connected at the other side to the said sliding contact-pieces, whereby the motion of said contact-pieces energizes one or the other of said magnets.

4. The combination with a supply-circuit and the end cells of a storage battery, of an end-cell switch, a fluid-pressure device for actuating said switch, two separate controlling contact-pieces insulated from each other, a set of contacts or bars over which said contact-pieces are movable, electric connections between the bars and the switch, a valve controlling the fluid-pressure device, an electric regulator controlling the contact-pieces, and electric means for actuating said valve whenever the regulator actuates the said contact-pieces.

5. The combination with a supply-circuit and the end cells of a storage battery, of an end-cell switch having main contacts and a brush coöperating therewith, a fluid-pressure device for actuating said switch, two separate controlling contact-pieces insulated from each other, a set of contacts or bars over which said contact-pieces are movable, electric connections between the bars and the switch, a valve controlling the fluid-pressure device, an electric regulator controlling the contact-pieces, and electric means for actuating said valve whenever the regulator actuates the said contact-pieces, and means whereby the switch-brush is caused to come to rest substantially centrally upon one of said main contacts.

In testimony whereof I have signed this specification in the presence of two subscribing witnesses.

JOSEPH BIJUR.

Witnesses:
OLIN A. FOSTER,
HERBERT G. OGDEN, Sr.